(12) United States Patent
Yang

(10) Patent No.: US 11,305,683 B1
(45) Date of Patent: Apr. 19, 2022

(54) SIDE DOOR CAR CAMPER

(71) Applicant: Kevin Yang, Rolling Hills Estate, CA (US)

(72) Inventor: Kevin Yang, Rolling Hills Estate, CA (US)

(*) Notice: Subject to any disclaimer, the term of this patent is extended or adjusted under 35 U.S.C. 154(b) by 0 days.

(21) Appl. No.: 17/149,512

(22) Filed: Jan. 14, 2021

(51) Int. Cl.
B60P 3/36 (2006.01)
B60P 3/34 (2006.01)

(52) U.S. Cl.
CPC .. *B60P 3/36* (2013.01); *B60P 3/34* (2013.01)

(58) Field of Classification Search
CPC ...... B60P 3/36; B60P 3/34; B60P 3/38; B60P 3/39; B60N 3/008
See application file for complete search history.

(56) References Cited

U.S. PATENT DOCUMENTS

| | | | | |
|---|---|---|---|---|
| 1,354,343 A * | 9/1920 | Schilling | ................ | B60N 3/008 5/119 |
| 3,063,064 A * | 11/1962 | Mace | ................... | B60N 2/2854 5/94 |
| 3,949,436 A * | 4/1976 | Fawess | ................... | A47C 9/027 5/657 |
| 5,735,002 A * | 4/1998 | Kistner | ................... | A61G 7/103 5/81.1 HS |
| 2020/0238879 A1* | 7/2020 | Yang | ...................... | A47B 31/06 |

* cited by examiner

Primary Examiner — Joseph D. Pape
(74) Attorney, Agent, or Firm — Clement Cheng

(57) ABSTRACT

A car door camper includes a connecting platform formed as a triangular platform having a connecting platform adapter edge, a platform inside edge, and a platform door edge. The platform door edge is configured to engage a door panel of a vehicle door. The platform inside edge is configured to engage a vehicle door frame at a door frame outside lower edge. A folding table has a table connecting edge engaging the connecting platform adapter edge. A latch loop strap having a latch loop hook is configured to engage a door latch loop on a vehicle door frame. The latch loop strap is mounted to a door latch loop corner formed at a junction between the platform door edge and the connector platform adapter edge.

13 Claims, 5 Drawing Sheets

SIDE DOOR CAR CAMPER

FIELD OF THE INVENTION

The present invention is in the field of car camping.

DISCUSSION OF RELATED ART

A variety of different car camping devices have been made for allowing campers to camp from cars.

SUMMARY OF THE INVENTION

The present invention is a car door camper than allows a user to camp from a foot well between a front seat and a front door of a vehicle. A platform allows the user to lay prone or sit without leaving the vehicle. The present invention can be implemented on the front left seat or the front right seat, or a rear left seat or a rear right seat.

A car door camper includes a connecting platform formed as a triangular platform having a connecting platform adapter edge, a platform inside edge, and a platform door edge. The platform door edge is configured to engage a door panel of a vehicle door. The platform inside edge is configured to engage a vehicle door frame at a door frame outside lower edge. A folding table has a table connecting edge engaging the connecting platform adapter edge. A latch loop strap having a latch loop hook is configured to engage a door latch loop on a vehicle door frame. The latch loop strap is mounted to a door latch loop corner formed at a junction between the platform door edge and the connector platform adapter edge.

A hinge strap has a hinge strap hook configured to engage a door hinge on a vehicle door frame. The hinge strap is mounted to a hinge strap corner formed at p junction between the connector platform adapter edge and a platform door edge. The platform inside edge is configured to face a front foot well of a vehicle that is in front of a front seat of a vehicle. The platform has a platform folding foot extending downwardly from the connecting platform.

The platform inside edge also has a door frame adapter having a door frame adapter vertical portion and a door frame adapter horizontal portion. The door frame adapter horizontal portion is configured to extend over a vehicle door frame. The door frame adapter vertical portion is connected to the platform inside edge.

The folding table also has a first foot and a second foot. The first foot and the second foot can lock in a deployed vertical position after unfolding from a stowed horizontal position. The folding table and further includes a foot brace. The foot brace is mounted on a foot brace pivot. The foot brace extends from a table plank of the folding table to the first foot and the second foot. The folding table has a table handle mounted at a table edge. The folding table engages to the connecting platform at a first hook and a second hook. The connecting platform has the first hook and the second hook mounted on the connecting platform adapter edge.

The following call out list of elements can be a useful guide in referencing the element numbers of the drawings.
10 Front Door
11 Front Door Hinge
12 Front Door Panel
13 Front Foot Well
14 Front Seat
15 Front Door Latch Loop
16 Front Door Latch Bumper
17 Front Door Frame
18 Front Door Frame Outside Lower Edge
19 Front Door Outside Lower Edge
20 Connecting Platform
21 Connecting Platform Adapter Edge
22 Platform Inside Edge
23 Platform Door Edge
24 Door Latch Loop Corner
25 Door Hinge Corner
26 Front Door Corner
28 First Hook
29 Second Hook
30 Platform Folding Foot
31 Door Frame Adapter
35 Latch Loop Strap
36 Hinge Strap
37 Hinge Hook
40 Folding Table
41 Table Handle
42 First Foot
43 Second Foot
44 Table Plank
45 Foot Brace
46 Foot Brace Pivot
47 Table Edge
48 Table Connecting Edge

DETAILED DESCRIPTION OF THE PREFERRED EMBODIMENT

Figure 1:
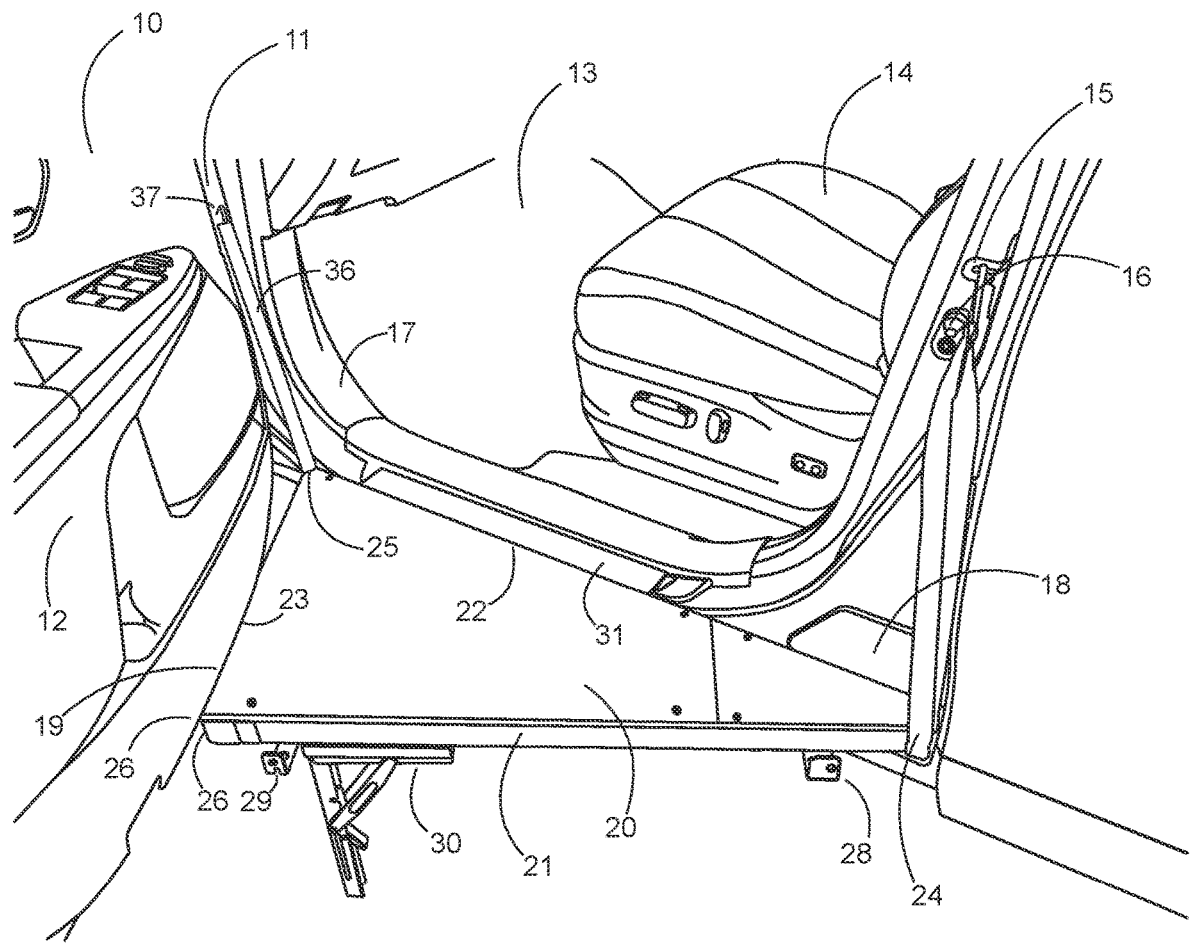
FIG. 1 is a partially assembled view of the present invention.

The present invention allows a user to go camping without leaving the car. As seen in FIG. 1 the vehicle has a driver's side front seat and a front door mounted to a front door frame 17. The front door 10 is mounted on a front door hinge 11 on the front door frame 17. A front door panel 12 of the front door 10 can have a front door outside lower edge 19. A front foot well 13 extends in front of a front seat 14. A front door latch bumper 16 engages the front door 10 when the front door is closed. A front door latch loop 15 is mounted to the front door frame 17 and has a rectangular profile with an opening for receiving a latch of the front door. The front door frame also has a front door frame outside lower edge 18.

A connecting platform 20 is formed as a triangular plank with a platform folding foot 30. The connecting platform 20 has a platform inside edge 22 with a door frame adapter 31 mounted to the platform inside edge 22. The door frame adapter 31 can be formed as an angular metal extrusion horizontal portion that that lays over the front door frame outside lower edge 18, and with a vertical portion that connects to the connecting platform 20 at the platform inside edge 22. The connecting platform 20 also has a connecting platform adapter edge 21 opposite the platform inside edge. The connecting platform adapter edge 21 preferably includes a first hook 28 and a second hook 29 that are rigidly mounted, or can be slide mounted or swivel mounted to the connecting platform 20.

The connecting platform 20 can be formed as a right triangle. The platform door edge 23 is preferably at a right angle to the connecting platform adapter edge 21. The platform door edge 23 may hold open the door at the front door outside lower edge 19 to prevent the door from closing when a user is partially occupying the connecting platform 20. The right triangle shape can thus have a wedge like operation to wedge open the front door 10. The front door latch loop 15 can receive a strap that connects to the door latch loop corner 24. Similarly, the door hinge corner 25 can receive a strap that connects to the front door hinge 11. The front door corner 26 can have an elastomeric exterior surface for wedging open the front door 10 at the front door outside lower edge 19.

Figure 2:
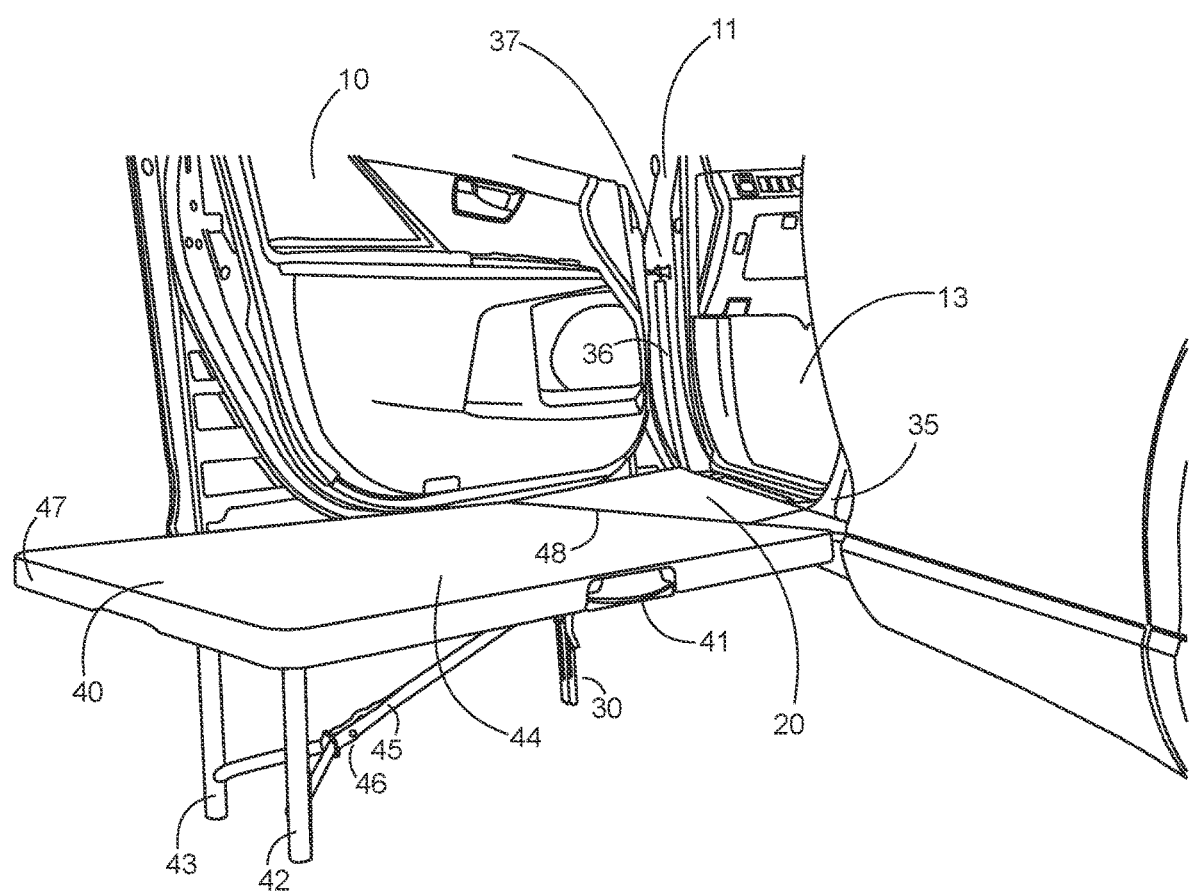
FIG. 2 is an assembled view of the present invention.

As seen in FIG. 2, the front door 10 has a front door hinge 11 that can receive a hinge strap 36 connecting the front door hinge 11 to the connecting platform 20 at the door hinge corner 25. The hinge hook 37 connects the hinge strap to the hinge to support the door hinge corner 25. The hinge strap 36 can be adjustable for providing a tension to support the door hinge corner 25. The front foot well 13 forms a continuous cavity at a continuous platform height with the connecting platform 20 and a folding table 40. The platform folding foot 30 folds downwardly from the underside of the connecting platform 20 and provides vertical stability. A latch loop strap 35 hangs from the latch loop by the hook, and the latch loop strap 35 can be tensioned such as at a buckle.

A folding table 40 may have a table handle 41. The folding table 40 has a first foot 42 and a second foot 43 that fold downwardly from a horizontal stowed position. The folding table 40 has a table plank 44 with a downwardly extending table edge 47. The foot brace 45 locks the first foot 42 and the second foot 43 in the extended vertical position. The foot brace 45 folds from a foot brace pivot 46. A table connecting edge 48 faces the connecting platform 20. The first hook 28 and the second hook 29 connect to the table connecting edge 48.

Figure 3:
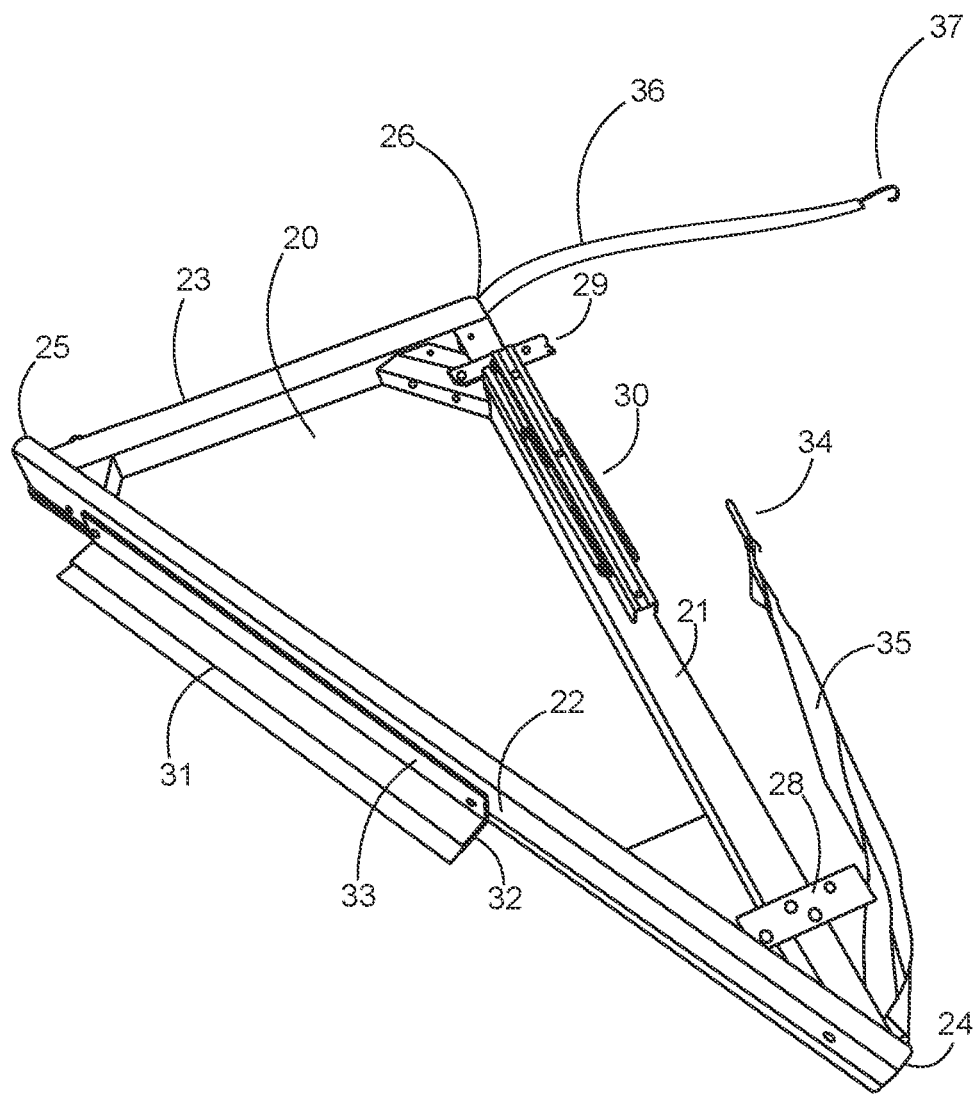
FIG. 3 is a stowed view of the connecting platform.

As seen in FIG. 3, a connecting platform 20 has a structure on its underside. For example, the connecting platform adapter edge 21 can be made as a horizontal support member or horizontal beam. Similarly, the platform inside edge 22 and the platform door edge 23 can be formed as a horizontal beam. The three horizontal beams can connect at the door latch loop corner 24, the door hinge corner 25, the front door corner 26. The first hook 28 and the second hook 29 can be mounted to an underside of the connecting platform adapter edge 21. If the connecting platform adapter edge 21 is formed as a horizontal beam, the first hook 28 and the second hook 29 can be connected at the left and right side of the horizontal beam. The platform folding foot 30 can be mounted to the connecting platform adapter edge 21 between the first hook 28 and the second hook 29.

The door frame adapter 31 can be formed as an angle metal extrusion with a door frame adapter horizontal portion 32 and a door frame adapter vertical portion 33. The door frame adapter vertical portion 33 can secure to the platform inside edge 22, while the door frame adapter horizontal portion 32 extends from the door frame adapter vertical portion 33.

The latch loop strap 35 carries a latch loop hook 34, and the latch loop strap 35 can be mounted at an underside of the door latch loop corner 24 at the junction of the platform inside edge 22 and the platform adapter edge 21. The hinge strap 36 carries a hinge hook 37, and the hinge strap 36 can be mounted at the front door corner 26 which is at the junction of the platform door edge 23 and the platform adapter edge 21.

Figure 4:
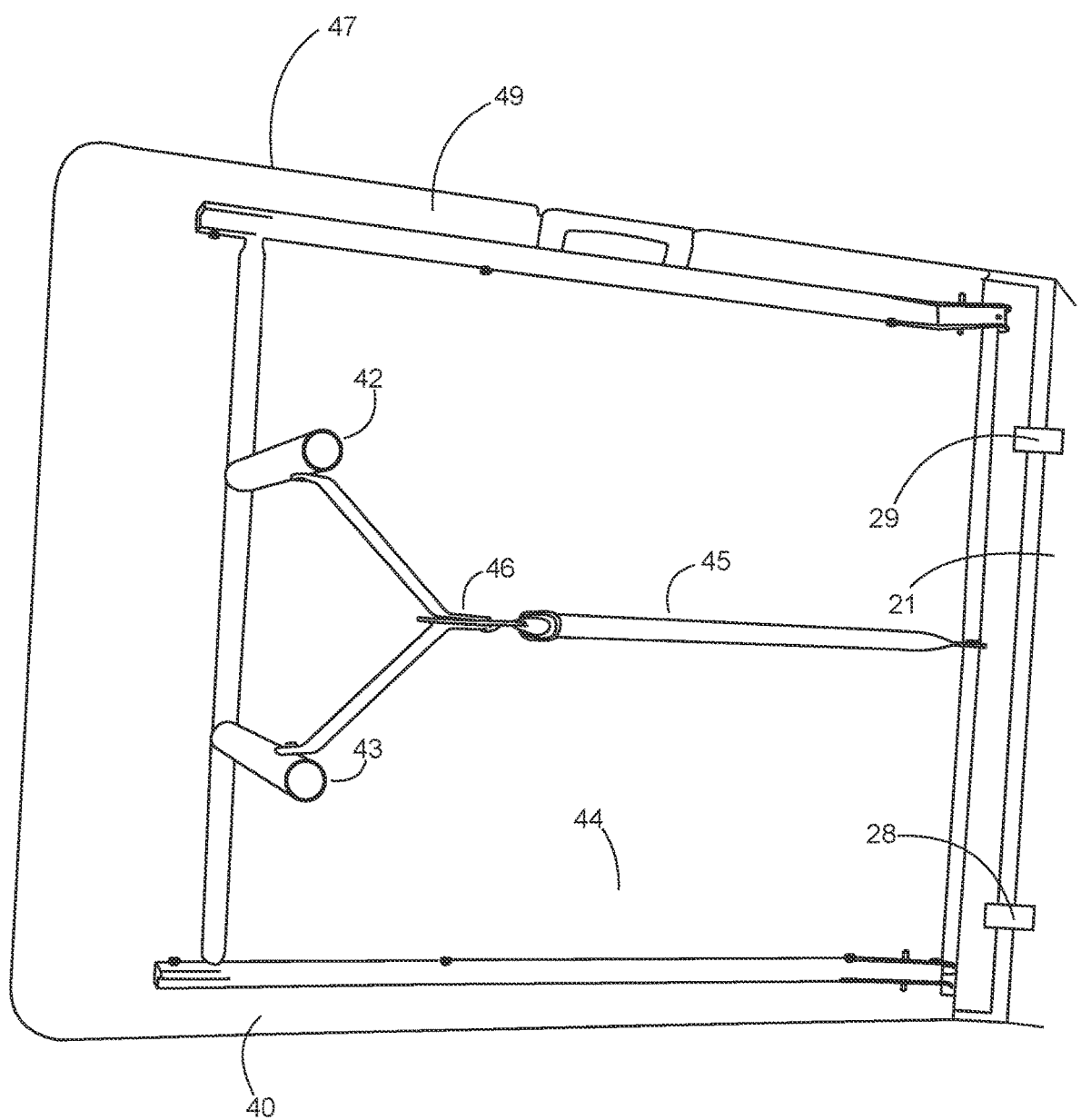
FIG. 4 is a stowed view of the folding table.

As seen in FIG. 4, the folding table 40 has a table underside 49 that receives a first hook 28 and second hook 29 hook at the table edge 47 of the folding table 40. The folding table 40 has a folding table first foot 42 and a folding table second foot 43 extending away from the table plank 44. The foot brace 45 and the foot brace pivot 46 are also mounted to the table underside 49.

A user first attaches the connecting platform 20 to the door frame, then attaches the pair of straps and secures the left and right corners of the connecting platform 20. The user can then unfold the folding foot to finish setting up the connecting platform 20. The user can then attach the folding table to the connecting platform 20. After setting up the connecting platform and the folding table, the user can use the area as a seating or sitting area maintaining the user's feet in the front foot well 13 of the vehicle. Thus, the user can set up a camping area without leaving the front seat area of the vehicle.

Additionally, the user can place a tarp over the door in case of rain. The tarp can be secured to the vehicle by magnets or other appropriate connectors.

Figure 5:
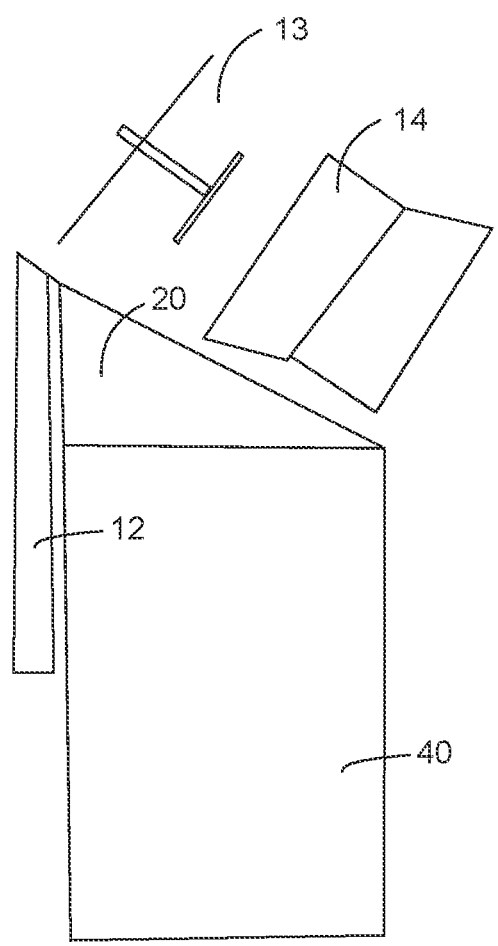
FIG. 5 is a top view of the present invention before the front seat is adjusted.

As seen in FIG. 5, a top view of the present invention shows the front seat location 14 before it is moved backward and the foot well area 13 is enlarged for user accommodation. The front seat is typically slidably mounted to the vehicle frame to allow adjustment in a front and back direction.

The invention claimed is:

1. A car door camper comprising:
   a. a connecting platform formed as a triangular platform having a connecting platform adapter edge, a platform inside edge, and a platform door edge, wherein the platform door edge is configured to engage a door panel of a vehicle door, wherein the platform inside edge is configured to engage a vehicle door frame at a door frame outside lower edge;
   b. a folding table having a table connecting edge engaging the connecting platform adapter edge;
   c. a latch loop strap having a latch loop hook configured to engage a door latch loop on the vehicle door frame, wherein the latch loop strap is mounted to a door latch loop corner formed at a junction between the platform door edge and the connector platform adapter edge; and
   d. a hinge strap having a hinge strap hook configured to engage a door hinge on the vehicle door frame, wherein the hinge strap is mounted to a hinge strap corner formed at a junction between the connector platform adapter edge and a platform door edge.

2. The car door camper of claim 1, wherein the platform inside edge is configured to face a front foot well of a vehicle that is in front of a front seat of the vehicle, wherein the platform has a platform folding foot extending downwardly from the connecting platform.

3. The car door camper of claim 2, wherein the platform inside edge further includes a door frame adapter having a door frame adapter vertical portion and a door frame adapter horizontal portion, wherein the door frame adapter horizontal portion is configured to extend over the vehicle door frame, and wherein the door frame adapter vertical portion is connected to the platform inside edge.

4. The car door camper of claim 1, wherein the folding table further includes a first foot and a second foot.

5. The car door camper of claim 4, wherein the first foot and the second foot lock in a deployed vertical position after unfolding from a stowed horizontal position, wherein the folding table further includes a foot brace, wherein the foot brace is mounted on a foot brace pivot, wherein the foot brace extends from a table plank of the folding table to the first foot and the second foot.

6. The car door camper of claim 1, wherein the folding table further includes a table handle mounted at a table edge.

7. The car door camper of claim 1, wherein the folding table engages to the connecting platform at a first hook and a second hook.

8. The car door camper of claim 7, wherein the connecting platform has the first hook and the second hook mounted on the connecting platform adapter edge.

9. The car door camper of claim 8, wherein the platform inside edge is configured to face a front foot well of a vehicle that is in front of a front seat of the vehicle, wherein the platform has a platform folding foot extending downwardly from the connecting platform.

10. The car door camper of claim 9, wherein the platform inside edge further includes a door frame adapter having a door frame adapter vertical portion and a door frame adapter horizontal portion, wherein the door frame adapter horizontal portion is configured to extend over the vehicle door frame, and wherein the door frame adapter vertical portion is connected to the platform inside edge.

11. The car door camper of claim 8, wherein the folding table further includes a first foot and a second foot.

12. The car door camper of claim 11, wherein the first foot and the second foot lock in a deployed vertical position after unfolding from a stowed horizontal position, wherein the folding table further includes a foot brace, wherein the foot brace is mounted on a foot brace pivot, wherein the foot brace extends from a table plank of the folding table to the first foot and the second foot.

13. The car door camper of claim 12, wherein the folding table further includes a table handle mounted at a table edge.

* * * * *